United States Patent
Costache et al.

(10) Patent No.: US 10,783,560 B2
(45) Date of Patent: Sep. 22, 2020

(54) SYSTEMS AND TECHNIQUES FOR CONFIGURING PROFILE MERGE RULES PRIOR TO DETERMINING SEGMENTS OF RECIPIENTS OF ELECTRONIC COMMUNICATION

(71) Applicant: Adobe Inc., San Jose, CA (US)

(72) Inventors: Catalin Costache, Bucharest (RO); Edward Schuchardt, New York, NY (US); David Weinstein, Rockville Centre, NY (US)

(73) Assignee: Adobe Inc., San Jose, CA (US)

( * ) Notice: Subject to any disclaimer, the term of this patent is extended or adjusted under 35 U.S.C. 154(b) by 900 days.

(21) Appl. No.: 14/932,550

(22) Filed: Nov. 4, 2015

(65) Prior Publication Data
US 2017/0124595 A1 May 4, 2017

(51) Int. Cl.
G06Q 30/00 (2012.01)
H04L 29/08 (2006.01)
G06Q 30/02 (2012.01)

(52) U.S. Cl.
CPC ......... *G06Q 30/0269* (2013.01); *H04L 67/22* (2013.01); *H04L 67/306* (2013.01)

(58) Field of Classification Search
CPC .... G06Q 30/0269; H04L 67/306; H04L 67/22
USPC ...... 705/317, 14.66, 14.49; 725/25; 455/411
See application file for complete search history.

(56) References Cited

U.S. PATENT DOCUMENTS

2004/0064334 A1\* 4/2004 Nye .................. G06F 17/30241
705/317
2011/0167440 A1\* 7/2011 Greenfield ............ H04L 63/102
725/25

OTHER PUBLICATIONS

Sales Force, "Audience Builder", http://help.exacttarget.com/en/documentation/adudience_builder , Jan. 2013-Dec. 2015, 2 pages.
Oracle "Managing Data Campaigns", https://docs.oracle.com/cloud/latest/daasmarketing_gs/dsmk/guid-c3a20da4-6fbe-4833-a7ff , Jan. 2015-Sep. 2015, 142 pages.

\* cited by examiner

*Primary Examiner* — Sun M Li
(74) *Attorney, Agent, or Firm* — Kilpatrick Townsend & Stockton LLP

(57) ABSTRACT

Systems and methods disclosed herein generate a segment of tracked entities from a collection of profiles merged from different sources. Individuals and other entities use multiple electronic device and online accounts. Options for merging authentication-based profiles and device-based profiles of tracked entities are presented on a user interface accessible to a tracking entity. Systems and methods receive a selection of the options, the selection specifying criteria for merging authentication-based profiles with device-based profiles. Upon generating a collection of profiles by merging the authentication-based and device-based profiles based on the received options, a targeted segment of tracked entities is generated by applying defined segment rules to the collection of profiles.

20 Claims, 5 Drawing Sheets

200

BASIC INFORMATION

Profile Merge Rule Name — 202

Description — 204

☐ Set as Default
(Affects new segments only)
212

PROFILE MERGE RULE SETUP — 214
Select authenticated and device options you want this rule to use for segmentation

Authenticated Options
☐ No Authenticated Profile — 216a
☐ Current Authenticated Profile — 216b
☐ Last Authenticated Profile — 216c

Device Options
☐ No Device Profile — 218a
☐ Current Device Profile — 218b
☐ Profile Merge Device Graph — 218c

AUTHENTICATED PROFILE OPTIONS — 220
Select the Cross Device Data Sources to use as the Authenticated Profiles for this rule ☐ CRM — 230a  ☐ Source 1 — 230b  ☐ Source 2 — 230c

DATA EXPORT CONTROLS — 222
☐ Segments using this cannot be linked to personally identifiable information

SYSTEMS AND TECHNIQUES FOR CONFIGURING PROFILE MERGE RULES PRIOR TO DETERMINING SEGMENTS OF RECIPIENTS OF ELECTRONIC COMMUNICATION

TECHNICAL FIELD

This disclosure relates generally to computer-implemented methods and systems and more particularly relates to configuring electronic communications.

BACKGROUND

Individuals and other entities commonly have multiple electronic devices and electronic accounts. For example, an individual may have a desktop computer, a laptop, a tablet, a cell phone, and a work computer. The individual may also have several bank accounts, several accounts for online retailers, several e-mail accounts, etc., and access the various accounts using the multiple electronic devices. It is desirable to be able to collect information about entities and use the information to provide targeted electronic communication to the entities. For example, it is desirable to identify that an individual is interested in baseball based on content accessed on the individual's devices and accounts. A tracking entity (which can include entities such as advertisers, marketers, and other agencies) can track actions taken by one or more tracked entities. Tracked entities can include entities such as organizations, end users/consumers, and devices used by the end users/consumers. A data management platform (DMP) can facilitate the collection of the data and apply segment rules on the collected data, allowing a tracking entity to identify the tracked entities that fall within a certain set of selected criteria. Tracked entities can be segmented to identify a group of entities (i.e., a segment) that are interested in baseball based on the tracked actions of those entities satisfying segment criteria. All tracked entities in the baseball-interest segment can then be targeted with an advertisement, for example, related to an upcoming baseball event.

While the large scale collection and aggregation of data across multiple entities and devices using electronic networks can greatly enhance the distribution and targeting of electronic communication, the electronic nature of the data collection creates hurdles unique to the network environment in which they are used. For example, DMPs ingest data from different data sources keyed off of different identifiers (e.g., data from particular devices, data from activity on particular user accounts, etc.). These different identifiers are tied to a particular user identifier (i.e. mapping data of many sources to a single identifier). However, one significant problem that arises due to the unique nature of electronic data collection is that the tracking entity (e.g., the advertiser, marketer, agency, etc.) has little or no control over how this mapping information is used to merge data from different sources. This can lead to the mixing of data from multiple tracked entities, which can dilute the accuracy of the desired segment.

Treating each device and each user account as its own entity does not accurately reflect a tracked entity because individuals and other tracked entities are typically associated with multiple devices and accounts. For example, a tracked entity may log on to an authenticated profile and access a tracking entity website using both a cellular phone and a tablet computer. Prior solutions of collecting data describing characteristics and activities of the user account as well as each device separately provides a fractured profile on the tracked entity. Therefore, prior solutions of segmenting a tracked entity based on behaviors expressed in an individual device profile, account profile, etc. provides a tracking entity an incomplete view for segmentation.

SUMMARY

Systems and methods disclosed herein generate a segment of tracked entities for targeting electronic communications from a collection of profiles for the tracked entities. The collection of profiles can include a collection of authentication-based profiles and device-based profiles for the tracked entities. An authentication-based profile refers to a collection of attributes and metadata collected for a particular authenticated user account. A device-based profile refers to a collection of attributes and metadata collected for a particular device, regardless of the users of the device have logged in to authenticated profiles. One embodiment involves presenting options for merging the authentication-based profiles and the device-based profiles for the tracked entities. Upon receiving a selection of the options, systems and methods create a collection of profiles by merging at least some of the authentication-based profiles and device-based profiles into a merged profile. Rules defining a segment can be applied to the merged profile, generating a targeted segment of tracked entities.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 2 is a diagram depicting an example of a user interface for presenting options for merging authentication-based profiles and device-based profiles.

DETAILED DESCRIPTION

Figure 1:
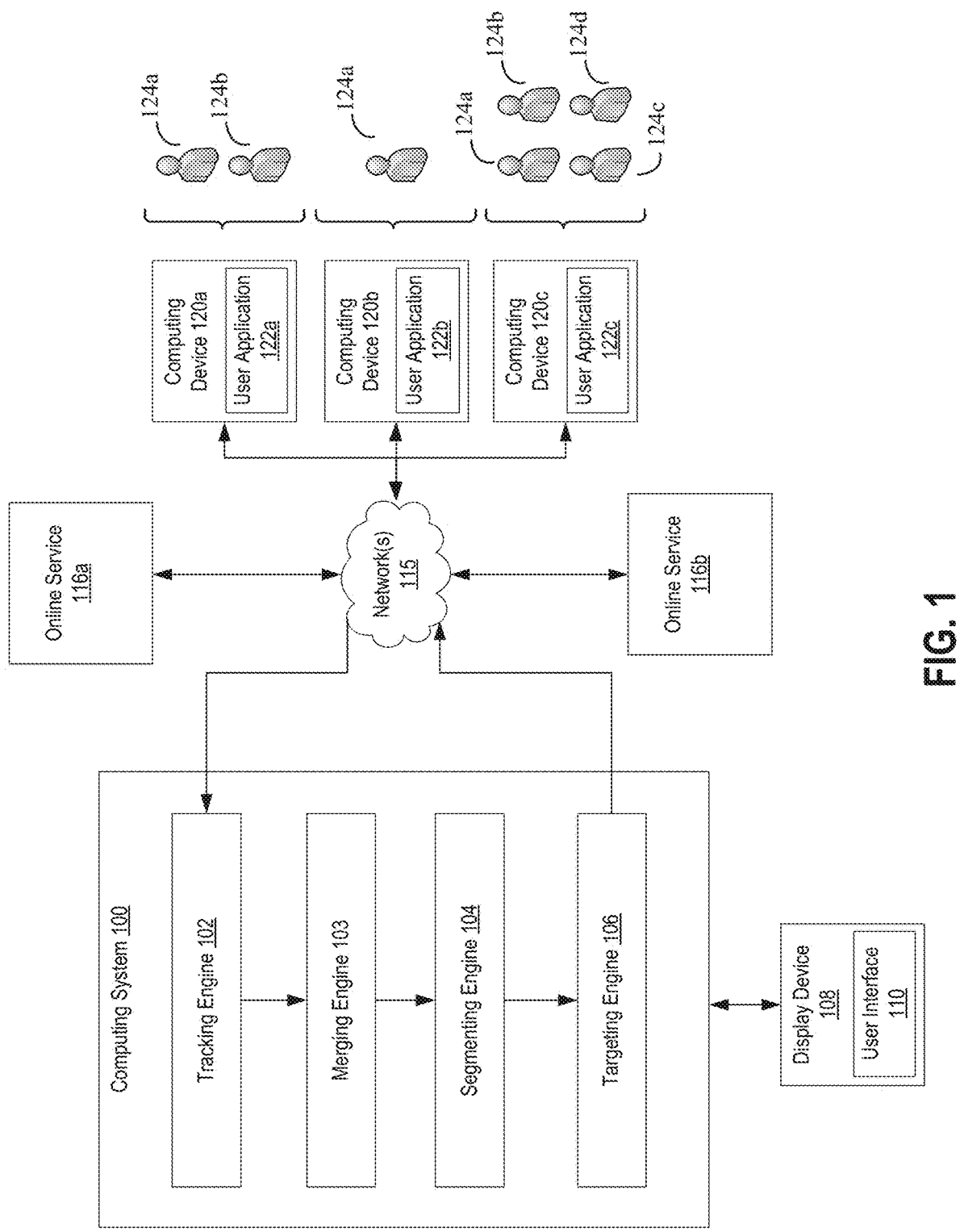
FIG. 1 is a block diagram depicting an example of a system for merging authentication-based profiles with device-based profiles and generating a segment of tracked entities from the collection of profiles.

Computer-implemented systems and methods are disclosed for customizing the merging of profile data from individuals and other entities prior to segmenting the entities for targeting purposes. As noted above, each tracked entity can be associated with one or more device-based profiles (e.g., a profile for a particular electronic device) as well as one or more authentication-based profiles (e.g., a profile associated with a particular user account with a tracking entity). An individual that is a customer at a bank, for example, has an authentication-based online profile with the bank (the tracking entity). The individual (the tracked entity)

accesses the online account via multiple electronic devices, such as a computer, tablet device, or cellular phone. Each electronic device is associated with a respective device-based profile. Due to the unique nature of large scale electronic data collection, tracking entities have little or no control over how the multiple profiles associated with tracked entities are mapped to a comprehensive identity. Embodiments disclosed herein allow a tracking entity to select options specifying criteria for how the authentication-based profiles should be merged with the device-based profiles prior to segmentation and targeting of electronic communication.

For example, a tracking entity that is a financial services marketer may need to ensure that any targeting of financial services is based on a single user's data and not data of multiple users that may be using a user device. Thus, the tracking entity selects options specifying that a known authenticated profile (e.g., a single user's authenticated information) is used for identifying the market segment but no device level data is used, as the device level data may include anonymous information on other users. In another example, the tracking entity selects options specifying that no device level data should be merged due to financial regulations or other limitations. As another example, a tracking entity is a retailer collecting data on multiple users in a single household that log in and purchase products off of the retailer's website. The tracking entity wants to use authenticated user level data (e.g., data from each authenticated user in the household) in combination with anonymous data collected across devices in the household. This allows the tracking entity to target offers based on the data from the individual users and data collected on the household level across devices.

After selecting the options specifying criteria for how authentication-based profiles should be merged with device-based profiles, the tracking entity can then apply segment rules on the collection of merged profiles for identifying a specific market segment. The increased flexibility of a tracking entity being able to specify how tracked entity data is merged prior to segmentation is a significant advantage over prior systems that provided no such flexibility.

As used herein, the term "tracking entity" is used to refer to organizations, individuals, and devices that track and collect data pertaining to characteristics and interactions (e.g., "traits" as defined below) of tracked entities. Examples of tracking entities include advertisers, retailers, web marketers, financial institutions, and other entities interested in collecting information on end user behavior.

As used herein, the term "tracked entity" is used to refer to organizations, individuals, and devices that perform activities that are tracked by tracking entities.

As used herein, the term "trait" is used to refer to a feature or characteristic of an organization, individual, device or of an activity performed by an organization, individual, or device that is collected or derived by a tracking entity. Examples of traits include (but are not limited to) user interactions that generated data; a name, address, an age or other demographic information, or other information about a user whose interactions generated the data; an internet protocol address of a device used to access a third-party website; a navigation history (clicks, hyperlink selections, etc.) of a browser used to access the third-party website; a purchase history of a user whose interactions generated the data; and the types of content (e.g., a video, an advertisement, etc.) presented by the third-party website and with which users interacted to generate the collected data.

As used herein, the term "segment" is used to refer to a list of individuals, devices, and other entities (tracked entities) that qualify for a set of rules defining a particular collection of one or more traits. The set of rules defining a particular collection of traits can be referred to as "segment rules." Thus, the collection of traits in a segment relate to a set of users (tracked entities) who share common attributes. Examples of a segment include (but are not limited to) a collection of traits related to tracked entities who viewed a particular advertisement on a particular webpage over a specified time range, a collection of traits related to tracked entities who viewed articles on a subject between a specified minimum amount of time and a specified maximum amount of time, a collection of traits related to tracked entities who purchased a particular product, a collection of traits related to tracked entities who purchased an item after viewing a product page on a particular website, and a collection of traits related to tracked entities that do not exhibit a particular characteristic (e.g., a collection of users who have a collection of traits for viewing a product and do not have any of a collection of traits that exhibit a particular characteristic such as buying the product). Traits may be combined in a segment using any suitable combination of Boolean operators (AND, OR, or NOT). Data describing a segment is stored using any suitable storage object (e.g., a database of the various traits for the segment).

As used herein, the term "authentication-based profile" is used to refer to a collection of trait data associated with an authenticated account for a particular tracked entity. The authentication-based profile can include trait information unique to the particular tracked entity. For example, an authentication-based profile can include the collection of trait data gathered while a tracked entity has logged in to a user account for an online service, the tracked entity being authenticated by entering a user name and passcode, exchanging a public/private encryption key pair, or other means of electronic authentication.

As used herein, the term "device-based profile" is used to refer to a collection of trait data associated with an electronic device. A device-based profile can include trait information gathered for all anonymous users of the electronic device. For example, a tracking entity may gather trait information received from an electronic device (e.g., a tablet computer) that is used by multiple tracked entities that may or may not have logged in to an authenticated profile. The device-based profile includes all trait data gathered that is associated with the device even considering non-authenticated users.

As used herein, the term "segmentation" is used to refer to the computer-implemented process of determining a segment.

Referring now to the drawings, FIG. 1 is a block diagram depicting a computing environment in which a computing system 100 can track data received from computing devices 120a-c and target electronic communications to particular segments of tracked entities 124a-d. The computing system 100 includes features for configuring options specifying how different authentication-based profiles and device-based profiles of the tracked entities 124a-d should be merged prior to defining a segment. As described above, individuals and other tracked entities can have different authentication-based profiles and different device-based profiles because tracked entities frequently use multiple electronic devices and share electronic devices when accessing online electronic content. FIG. 1 reflects this by depicting tracked entities 124a as using multiple computing devices 120a-c. Similarly, in this example, tracked entity 124b uses multiple computing device 120a, 120c. Tracked entities also often share electronic devices, such as when multiple users in a household have individual accounts and share a common tablet computer or personal computer. FIG. 1 depicts this with tracked entities 124a-d all sharing computing device 120c.

The computing system 100 tracks and collects traits and data from tracked entities 124a-d as the tracked entities 124a-d interact with one or more online services 116a-b. Online services 116a-b provides applications, data, and other functions that are accessed by computing devices 120a-c via a network 115. The network 115 includes the Internet and also include local intranets or other suitable networks. Examples of the online services 116a-b include, but are not limited to, social media websites, websites for purchasing products or services, customer facing websites for financial institutions, etc. The computing devices 120a-c execute respective user applications 122a-c that are used to access the online services 116a-b. Examples of the user applications 122a-c include, but are not limited to, web browsers for accessing websites provided by the online services, applications specific to the online services, etc. Electronic communications between computing devices 120a-c and online services 116a-b are tracked and traits collected by computing system 100. In some embodiments, the computing system 100 includes its own online service (not shown) through the use of a web server, media server, or other content server and track tracked entity 124a-d interactions with the computing system 100 online service and collect traits based on those interactions.

Each tracked entity 124a-d can be associated with one or more authentication-based profiles for each of the online services 116a-b accessed by the tracking entities 124a-d. For example, if online service 116a is a financial services website, each tracked entities 124a-d has a separate user account (authentication-based profile) with online service 116a. Similarly, each computing device 120a-c can be associated with a unique device-based profile identifying the computing device. The computing system 100 stores, in a database in memory (not shown), identifiers identifying the authentication-based profiles and device-based profiles.

To track and collect traits and data from tracked entities 124a-d, merge collected data from the different profiles of the tracked entities 124a-d, determine the required segments, and provide targeted electronic communications to the determined segments, the computing system 100 includes computer-readable memory storing instructions for executing a tracking engine 102, a merging engine 103, a segmenting engine 104, and a targeting engine 106. In some embodiments, one or more of the tracking engine 102, merging engine 103, segmenting engine 104, and targeting engine 106 are included in one or more computer server systems separate from the computing system 100 and communicating with the computing system 100 via network 115 or other network.

The tracking engine 102 collects traits from tracked entities 124a-d as well as from computing devices 120a-c used by the tracked entities 124a-d. The computing system 100 includes a database in memory that stores tracked traits of each tracked entity 124a-d and computing device 120a-c. For each trait associated with a tracked entity 124a-d authentication-based profile, the tracking engine 102 stores information and details regarding the collected trait in a database and associate the trait information with the appropriate authentication-based profile identifier. Similarly, for each trait associated with computing device 120a-c, the tracking engine 102 stores information an details regarding the collected trait in a database and associate the trait information with the appropriate device-based profile identifier. The tracking engine 102 provides the collected data and profile information to merging engine 103.

Based on inputs received by the computing system 100 selecting profile merge configurations, merging engine 103 merges authentication-based and device-based profiles for computing devices 120a-c and tracked entities 124a-d. In one example, inputs selecting profile-merge configuration options specify that authentication-based profiles should be merged with device-based profiles. In this example, trait information collected for the authentication-based profile for tracked entity 124a and trait information collected for the authentication-based profile for tracked entity 124b is merged with trait information collected for the device-based profile of computing device 120a. This configuration option is useful, for example, for a tracking entity that is an online streaming video provider that intends to target product recommendations based on overall household device activity as well as individual user account activity.

In another example, inputs selecting profile merge configuration options specify that traits collected a current device profile should be merged with traits collected on a last known authentication-based profile. This configuration option is useful, for example, for a tracking entity that intends to send targeted electronic communications to the last known authenticated user of a computing device 102 (i.e. merge trait information regarding the last known authentication-based profile with trait information for a particular computing device 102). Other options for merging profiles via the merging engine 103 are possible and additional examples are discussed below.

The merging engine 103 provides the merged profile information to segmenting engine 104. Based on input into the computing system 100 specifying segment rules, the segmenting engine 104 applies the segment rules to the merged profiles received from merging engine 103 to generate the desired target segment. In an example, a segment rule is defined to identify a set of users that have received a particular electronic communication a minimum number of times (e.g., ten times). The segmenting engine 104 applies this segment rule to the merged profiles received from merging engine 103 to output a segment that includes the merged profiles satisfying the segment rule.

For example, the computing system 100 receives as input profile merge rules specifying that all device-based profiles for a particular authentication-based profile should be merged. This is useful, for example, in a situation where a tracking entity intends to target electronic communications to authenticated users that access online content using multiple devices while taking into account data and traits collected on each of the user's devices. In this example, traits associated with authentication-based profile for tracked user 124a will be merged with traits associated with device-based profiles for computing devices 120a-c. Similarly, traits associated with authentication-based profile for tracked user 124b will be merged with traits associated with device-based profiles for computing devices 124a, 124c. Continuing the segment rule example from above, the computing system 100 also receives as input a segment rule defining a segment as users that have received a particular electronic communication a minimum number of times (e.g., receiving a particular communication 10 times). The segmenting engine 104 will apply the segment rule to the merged profile, providing as output the tracked entities 124a-d that have received the particular electronic communication a minimum number of times across all computing devices 120a-c used by the tracked entity. For example, if tracked user 124a received the electronic communication on computing device 120a six times, received the electronic communication on computing device 120b three times, and received the electronic communication on computing device 120c four times, the merged profiles indicate that tracked user 124a received the electronic communication thirteen times. The segmenting engine 104 will thus include tracked entity 124a as a member of the segment in this example.

The segmenting engine 104 provides the generated segment to targeting engine 106. The targeting engine 106 provides electronic communications to the tracked entities 124a-d and computing devices 120a-c that fall within the segment identified by segmenting engine 104. Continuing the example above, for recipients in a segment that received a first electronic communication ten times, the targeting engine 106 is configured to provide a second electronic communication. For recipients outside the segment (recipients that have not received the first electronic communication ten times), the targeting engine 106 is configured to provide the first electronic communication. Embodiments described herein thus allow a tracking entity using the computing system 100 to define how authentication-based profiles and device-based profiles should be merged and provide targeted electronic communications to members of the merged profiles that satisfy defined segment rules.

To define how authentication-based profiles and device-based profiles should be merged and to define segment rules, the computing system 100 is communicatively coupled to a display device 108 with a user interface 110. The user interface 110 presents options specifying how authentication-based and device-based profiles should be merged. The user interface 110, in this example, also presents prompts requesting segment rules. The user interface 110 includes any suitable electronic input device for receiving inputs, such as a touchscreen interface, a computer display communicatively coupled with mouse and keyboard inputs, or other suitable input devices. Inputs defining profile merge options and segment rules are received via user interface 110 and provided as inputs to merging engine 103 and segmenting engine 104.

FIG. 2, for example, is a diagram depicting an example interface 200 for receiving inputs specifying profile merge options. Interface 200 include a section for basing information about the profile merge option, including a dialog box 202 for the profile merge rule name and a dialog box 204 for a description of the profile merge option. A radio button 212 presents an option specifying whether the profile merge rule should be set as default. By receiving an input selecting radio button 212, merging engine 103 applies the settings in interface 200 as default settings for new segments, but does not change any existing defaults for existing segments.

Details regarding the profile merge rule are presented via window 214. For example, interface 200 presents authentication-based profile merge options 216a-c and device-based profile merge options 218a-c. While FIG. 2 depicts authentication-based profile merge options 216a-c and device-based profile merge options 218a-c as presented via radio buttons, other interface elements for presenting the authentication-based profile merge options 216a-c are possible. Authentication-based profile merge options 216a-c include options such as no authenticated profile 216a, current authenticated profile 216b, and last authenticated profile 216c. The no authenticated profile option 216a specifies that no authentication-based profile should be used when merging with device-based profiles (e.g., when a tracking entity intends to target devices with anonymous user information such as users accessing online services who do not have authenticated accounts with the online service/tracking entity). The current authenticated profile option 216b specifies that current authentication-based profiles should be used when merging with device-based profiles (e.g., when a tracking entity intends to target tracked entities 124a-d such as users with online accounts accessing online services while logged in with those accounts). The last authenticated profile option 216c specifies that the last known authentication-based profile should be used for merging with device-based profiles. For example, a selection specifying the last authenticated profile option 216c can be received when targeting a last known user without forcing authentication.

Turning to the device-based profile merge options, the no device profile option 218a specifies that no device-based profiles should be used when merging with authentication-based profiles. The current device profile option 218b specifies that the device level traits and gathered activity should be merged with the selected authentication-based profiles. The profile merge device graph 218c specifies that gathered traits and device data from the last 'X' number of devices that a tracked entity has authenticated on should be used for merging, where 'X' is any number configurable via the interface 200. Alternatively, 'X' number of devices may be pre-configured. For example, receiving an input selecting the profile merge device graph 218c may specify that gathered traits and device data from the last 3 devices that have been authenticated should be used for merging. The profile merge device graph option 218c can be received as a selection when targeting a user that accesses online services using multiple devices.

In addition to the above, other authentication-based profile merge options and device-based profile merge options are also possible. For example, a household device graph option (not shown) can also be presented on interface 200. The household device graph option can be received as a selection when a tracking entity intends to target users that utilize a particular grouping of devices (e.g., tracking data for all computing devices 102a-c within a household). A household device option can group and merge device-based profiles based on, for example, a common Internet Protocol address, a common geographic area, or other common traits. Another device-based profile merge option can include a user device graph option (not shown), which is similar to the profile merge device graph 218c in that multiple data points for traits and device data are used for merging. Unlike the profile merge device graph 218c, however, the user device graph option gathers a broader set of data points. Data points used for merging using the user device graph option include IP addresses, location data, user behavior, and other probabilistic data points. Thus, the user device graph option executes an algorithm that links devices together to approximate a tracked entity without requiring explicit authentication. For example, the user device graph option correlates like IP addresses and other inputs between devices to determine a set of devices that are used by a tracked entity. The user device graph option uses all devices determined as relating to a tracked entity for segmentation.

The interface 200 can also present a window 220 presenting authenticated profile options 230a-c. The authenticated profile options 230a-c presented in window 220 provide further granular control over which authenticated sources to use for merging. For example, a tracking entity may manage multiple authentication sources. An example of this is a tracking entity that operates multiple websites with different authenticated logins for tracked entities. A tracking entity that is an entertainment producer may operate one website that for a first entertainment network and a second website for a second entertainment network. Tracked entities may have authenticated profiles and log into one or both of the websites. The tracking entity can select which website to use as the source data by selecting an authenticated profile option 230b indicating the first authentication data source or authenticated profile option 230c indicating the second authentication data source. The Customer Relationship Management (CRM) 230a option indicates that all traits and device data gathered from tracking entities should be used for merging. The authenticated profile options 230a-c may be customized for the tracking entity. For example, authenticated profile option 230b (indicating authentication source 1) would specify the name of the first website in window 220, and authenticated profile option 230c would specify the name of the second website in window 220.

The selections for the authenticated profile options 230a-c work in conjunction with the selections for authentication-based profile merge options 216a-c. If the current authenticated profile 216b and authenticated profile option 230b (indicating source 1) are received as selections, merging engine 103 uses collected trait information from the current tracked entity that are authenticated on the first authenticated source of the tracking entity, even if the tracked entity is logged on and authenticated with multiple sources (e.g., multiple websites) of the tracking entity. If the last authenticated profile 216c and authenticated profile option 230b are received as selections, merging engine 103 uses collected trait information from the last known authentication on the first source of the tracking entity.

In some aspects, tracking entities may need to ensure that no personally identifiable information is used in determining segments. For this scenario, interface 200 presents window 222 with an option for data export controls. By receiving a selection for the radio box in window 222, the merging engine 103 will filter out personally identifiable information from tracked entities 124a-d before providing the merged profiles to the segmenting engine 104. Examples of personally identifiable information include the name, social security number, or other identifiable traits of a tracked entity.

Options selecting one or more options in interface 200 are received via user interface 110 in order to define various profile merge configurations. Different profile merge configurations provide a tracking entity significant flexibility for targeting specific segments of tracked entities at various levels of granularity. For example, inputs selecting current authenticated profile option 216b and no device profile option 218a can be received in combination for one profile merge configuration. This allows a tracking entity to target tracked entities 124a-d based on single user authenticated data only while not taking into account anonymous device level data or data gathered from other users. An example use case is a financial services marketer (e.g., tracking entity) that needs to ensure onsite targeting is only using a single user's data for segmentation and not multiple user's data to comply with regulations.

In another example, inputs selecting current authenticated profile option 216b or 216c, multiple authenticated profile options 230a-c (i.e. multiple data sources), and no device profile option 218a can be received in combination for a profile merge configuration. This allows a tracking entity to target tracked entities 124a-d based on single user authenticated data from multiple sources. An example use case is an online media streaming service provider (e.g., a tracking entity) that needs to target individual authenticated users of the streaming service within a household to provide customized media recommendations and also wants to include household level recommendations. The selection for no device profile 218a indicates that anonymous device data will not be included in the recommendations. The authenticated profile options 230a-c specify the authenticated profiles/data sources to use for data collection and segmentation. If inputs selecting multiple authenticated profile options 230a-c are selected, multiple data authenticated sources are merged.

In another example, inputs selecting no authenticated profile option 216a and current device profile option 218b are received in another profile merge configuration. This allows a tracking entity to only use device-level activity to target the device users. For example, a consumer product company may collect trait information from computing devices 120a-c regardless of the specific user (i.e. all anonymous device-level activity will be gathered and merged).

In another example, inputs selecting no authenticated profile option 216a and user device graph option are received as another profile merge configuration. In this example, the tracking entity can be a credit card company that is prospecting to obtain new credit card members. As the target audience does not yet have authenticated profiles, the profile merge device graph option 218c is not possible. Receiving a selection of no authenticated profile option 216a and user device graph option enables targeting of a user across devices with consistent messaging and the use of frequency caps.

In another example, inputs selecting no authenticated profile option 216a and a household device graph option are received as another profile merge configuration. This allows a tracking entity to target computing devices 120a-c across a household or other common location without considering traits from tracked entities 124a-d. This is useful, for example, for a tracking entity that is a travel booking company offering sales (via electronic communications) on select vacation packages. Since the target audience does not currently have authentication-based profiles with the travel booking company, the travel booking company targets the computing devices 120a-c in the household, thus reaching all anonymous users with consistent messaging.

In another example, inputs selecting the last authenticated profile option 216c with current device profile 218b are received as another profile merge configuration. This allows a tracking entity to target the last known authenticated user of a device. This is useful, for example, for a tracking entity has authenticated access for its online service, has information indicating that a tracked entity 124a has previously logged on to the online service via an authentication-based profile, but has not currently logged while accessing the online service via the computing device 120a.

In another example, inputs selecting the current authenticated profile 216b or last authenticated profile 216c, current device profile 218b, and authenticated profile options 230a (indicating CRM) and 230b (indicating to merge one of multiple profile sources) are received as another profile merge configuration. This allows a tracking entity to target a tracked entity 124 based on known household and user activity across devices across devices in order to deliver targeted communications based on the household, user, and anonymous activity on the currently authenticated device.

In another example, inputs selecting the current authenticated profile option 216b and a user device graph profile option are received as another profile merge configuration. This allows a tracking entity to target tracked entities based on both authenticated data of a tracked entity 124a collected across computing devices 120a-c in combination with anonymous data collected across computing devices 120a-c.

This can be useful, for example, for a tracking entity that intends to target offers based on the users across all tracked devices.

In another example, inputs selecting the current authenticated profile 216b or the last authenticated profile 216c, multiple data sources via authenticated profile options 230a (indicating CRM) and 230b (indicating to merge one of multiple profile sources), a current device profile 218b, and a household level device graph selection (not shown) are received as another profile merge configuration. This allows a tracking entity to target authenticated user level data and authenticated household level data across devices in combination with anonymous data collected across devices in the household. This allows the tracking entity to target communications based on the complete cross device activity for the tracked entities in the household.

Figure 3:
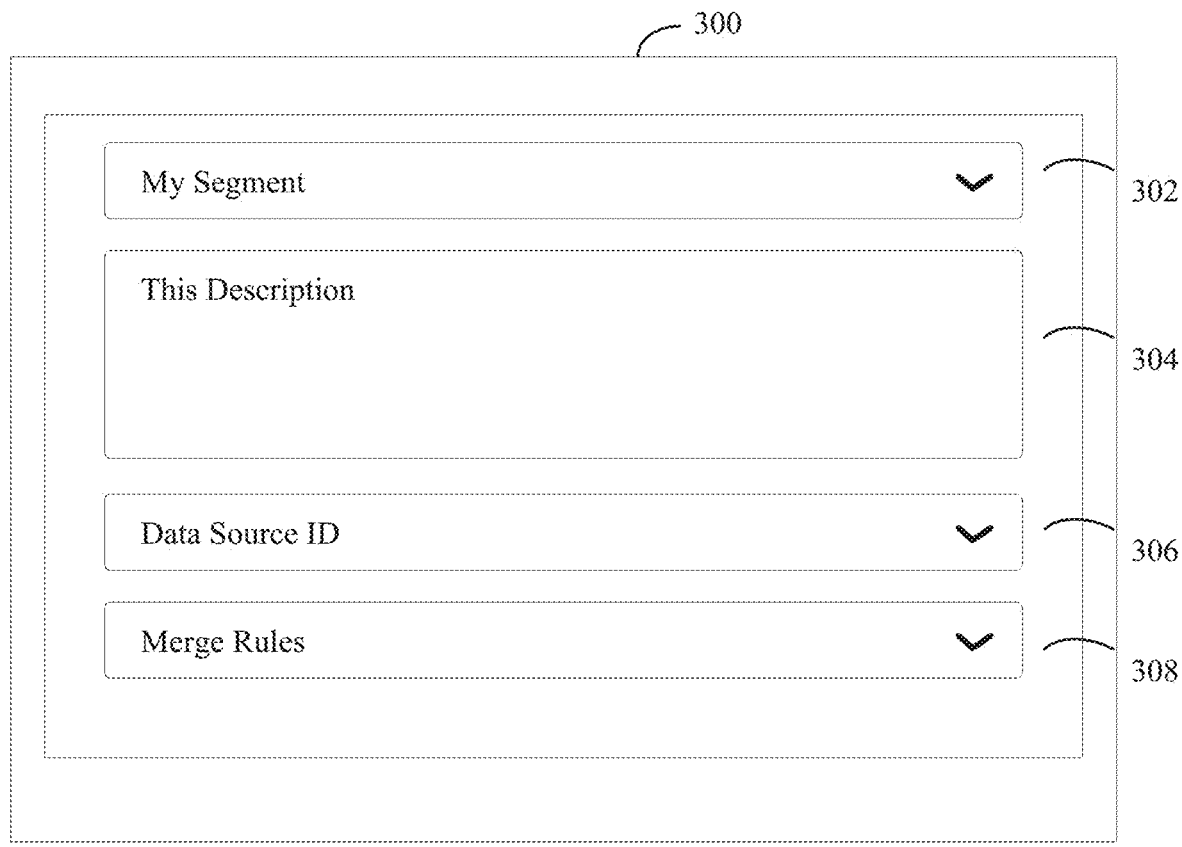
FIG. 3 is a diagram depicting an example of a user interface for presenting options for entering segment rules.

In one embodiment, along with receiving inputs specifying profile merge options, the computing system 100 also receives inputs specifying segment rules via user interface 110. FIG. 3 is a diagram depicting an example interface 300 for presenting queries regarding segment rules. Interface 300 includes, for example, a dialog prompt 302 for receiving as input the name of a segment and a dialog box 304 for receiving as input the description of the segment. Further, interface 300 includes a dialog prompt 306 for receiving as input the segment rule(s). Segment rules are specified as, for example, specific traits desired for the segment. In some embodiments, multiple segment rules are specified via logical operators (e.g., AND, OR, NOT, etc). For example, to identify a segment of tracked entities of individuals over 25 years of age and have accessed sporting-related online services, the requested traits are received in dialog prompt 306 with an AND operator. Interface 300 also includes dialog prompt 308 for selecting one of the merge rules that were defined via interface 200. Merge rules may be presented in dialog prompt 308 via a drop box that lists the merge rules by the names specified in dialog prompt 202 (shown in FIG. 2). Receiving an input selecting a merge rule 308 applies the selected merge rule to the segment. For example, a profile merge rule can specify that traits gathered under a loyalty authentication-based profile should be merged with a device profile. In this example, the segment rules defined in interface 300 are applied to the collection of profiles defined by the loyalty authentication-based profile and device profile.

Figure 4:
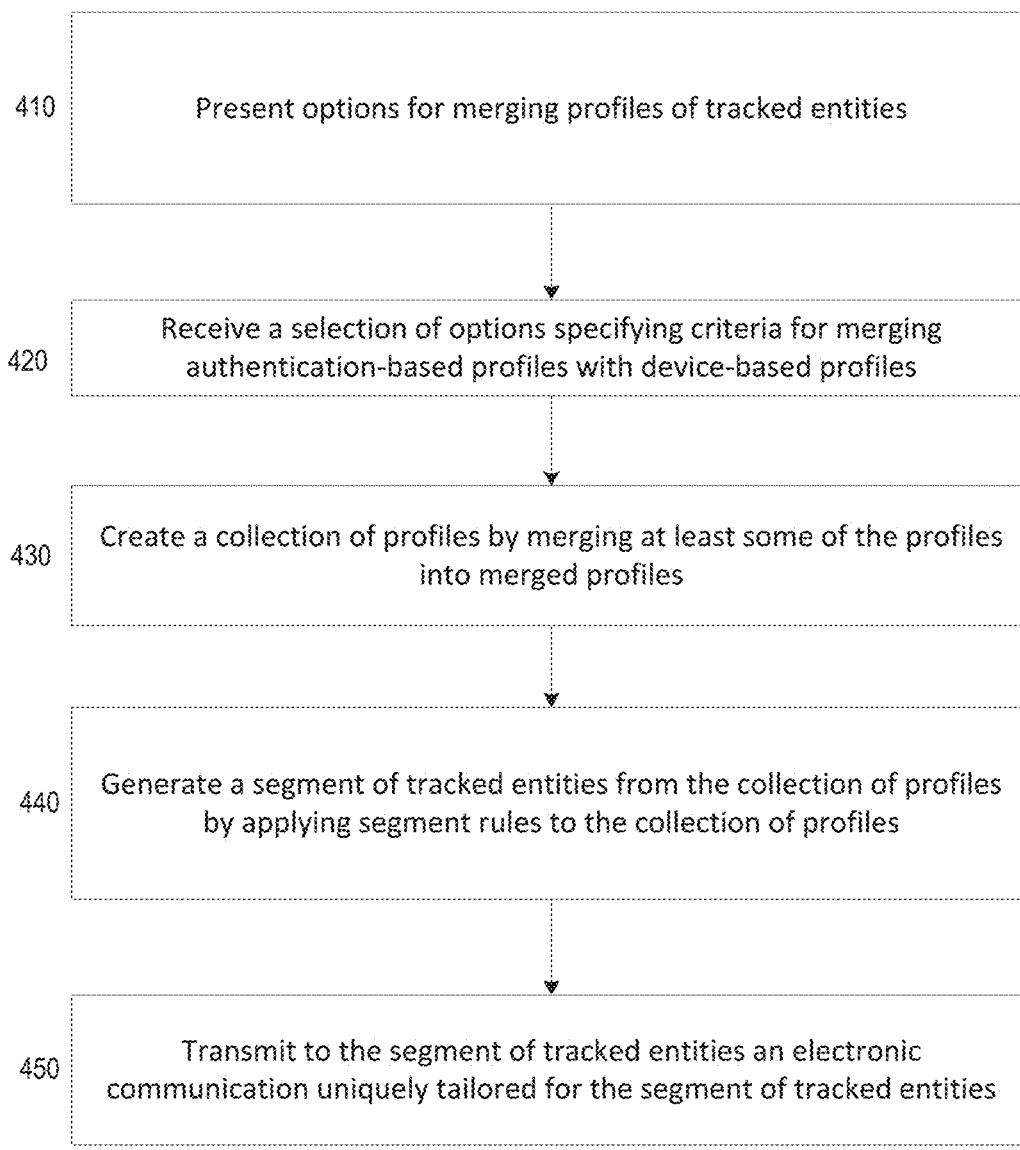
FIG. 4 is a flowchart illustrating an exemplary method for generating a segment of tracked entities from the collection of profiles.

FIG. 4 is a flowchart depicting an example process 400 for merging authentication-based profiles with device-based profiles. The process 400 may be performed by one or more of the components listed in FIG. 1 or by any other suitable component or in any suitable computing and/or communication environment.

The process 400 involves presenting options for merging profiles of tracked entities, as shown in block 410. For example, a computing device presents interface 200 via user interface 110. As discussed above, interface 200 presents options for merging authentication-based profiles via authentication-based profile merge options 216a-c and device-based profiles via device-based profile merge options 218a-c.

The process 400 further involves receiving a selection of options specifying criteria for merging authentication-based profiles with device-based profiles, as shown in block 420. For example, computing system 100 receives inputs via user interface 110, the inputs indicating a selection of options specifying the criteria for merging profiles. In one embodiment, options for merging authentication-based profiles and device-based profiles are selected via radio check boxes. Details of the various profile merge configurations and use cases are discussed above with respect to FIG. 2. The selection of options specifying the criteria for merging profiles are provided to merging engine 103 executing in memory of computing system 100.

The process 400 further involves creating a collection of profiles by merging at least some of the profiles into merged profiles, as shown in block 430. As discussed above, authentication-based profiles for each tracked entity 124a-d and device-based profiles for computing devices 120a-c are identified and stored as identifiers in a memory of computing system 100. The computing system 100 also stores, in a database in the memory, information on the collected traits associated with each of the of the authentication-based profile identifiers and device-based profile identifiers. The merging engine 103 merges the authentication-based profiles and device-based profiles specified by the received selection of options by merging the collected trait information associated with the selected profile identifiers and generating a collection of merged trait information.

The process 400 further involves generating a segment of tracked entities from the collection of profiles by applying segment rules to the collection of profiles. For example, the collection of profiles generated in step 430 is provided to segmenting engine 104. Segmenting engine 104 can also receive, via user interface 110, one or more segment rules defining the intended segment. Segmenting engine 104 applies the received segment rules to the collection of profiles to generate a segment of tracked entities. In one example, segment rules indicate that the desired target segment includes individuals over 30 years of age who spend a minimum amount of time on a streaming video website. The segmenting engine 104 evaluates the segment rules against the collection of profiles to determine the tracked entities within the collection of profiles that are over 30 years of age and spend a minimum amount of time on a streaming video website.

The process further includes transmitting, to the segment of tracked entities, an electronic communication uniquely tailored for the segment of tracked entities, as shown in block 450. For example, targeting engine 106 transmits an electronic communication to tracked entities 124a-d that satisfied the segment rule(s). The electronic communication is uniquely tailored to the segment of tracked entities. For example, a tracking entity may intend to provide a certain electronic advertisement specifically to tracked entities that have purchased a car during the last year. In this example, segmenting engine 104 identifies the tracked entities that satisfy the segment—those that have purchased a car in the last year. Targeting engine 106 transmits the unique advertisement to the identified segment.

Figure 5:
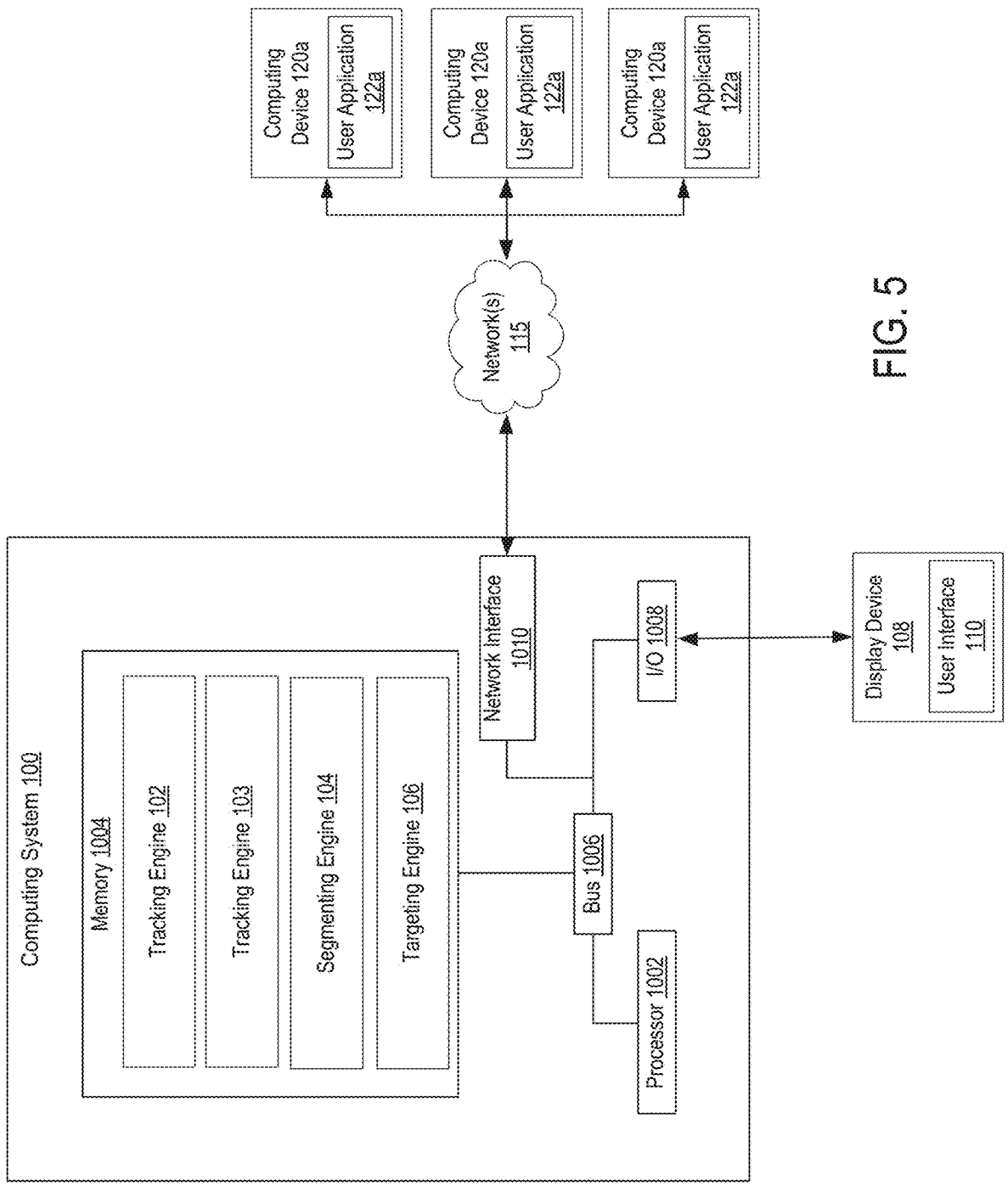
FIG. 5 is a block diagram depicting example hardware implementations for the components described in FIG. 1.

Any suitable computing system or group of computing systems can be used to implement the computing system 100 and computing devices 120a-c. For example, FIG. 5 is a block diagram depicting examples of implementations of such components. The computing system 100 can include a processor 1002 that is communicatively coupled to a memory 1004 and that executes computer-executable program code and/or accesses information stored in the memory 1004. The processor 1002 may comprise a microprocessor, an application-specific integrated circuit ("ASIC"), a state machine, or other processing device. The processor 1002 can include one processing device or more than one processing device. Such a processor can include or may be in communication with a computer-readable medium storing instructions that, when executed by the processor 1002, cause the processor to perform the operations described herein.

The memory 1004 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing system 100 may also comprise a number of external or internal devices such as input or output devices. For example, the computing system 100 is shown with an input/output ("I/O") interface 1008 that can receive input from input devices or provide output to output devices. Display device 108, for example, can be communicatively coupled to I/O interface 1008. A bus 1006 can also be included in the computing system 100. The bus 1006 can communicatively couple one or more components of the computing system 100.

The computing system 100 can execute program code that configures the processor 1002 to perform one or more of the operations described above. The program code can include one or more of the tracking engine 102, merging engine 103, segmenting engine 104, or targeting engine 106. The program code may be resident in the memory 1004 or any suitable computer-readable medium and may be executed by the processor 1002 or any other suitable processor. In some embodiments, the modules can be resident in the memory 1004, as depicted in FIG. 5. In additional or alternative embodiments, one or more modules can be resident in a memory that is accessible via a data network, such as a memory accessible to a cloud service.

The computing system 100 can also include at least one network interface device 1010. The network interface device 1010 can include any device or group of devices suitable for establishing a wired or wireless data connection to one or more data networks 115. Non-limiting examples of the network interface device 1010 include an Ethernet network adapter, a modem, and/or the like. The computing system 100 can transmit messages as electronic or optical signals via the network interface device 1010.

The computing devices 120*a-c* can similarly each include a processor that is communicatively coupled to a memory and that executes computer-executable program code and/or accesses information stored in the memory and otherwise include similar computing components as described with respect to computing system 100.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   accessing profiles for a plurality of tracked entities, the profiles comprising (a) authentication-based profiles having trait data keyed to user account identifiers and collected during interactions with one or more online services that have authenticated the user account identifiers and (b) device-based profiles having trait data keyed to identifiers of computing devices that interact with the one or more online services;
   receiving, from an input device and via a user interface displaying merge options, a selection of authentication-based profile merge options and device-based profile merge options, the selection comprising:
   (a) one or more of:
      (i) a no-device-profile option that prevents device-based profiles from being merged with selected authentication-based profiles, (ii) a current-device-profile option specifying that device-level traits and associated tracked activity should be merged with the selected authentication-based profiles, (iii) a profile-merge-device-graph option specifying that gathered a set of traits for a set of most recently tracked devices and a set of device data from the set of most recently tracked devices, wherein a number of devices in the set of most recently tracked devices is configurable via the user interface, (iv) a household-device-graph option specifying that a household set of device-based profiles having a common IP address or a common geographic location are to be merged, and (v) a user-device-graph option specifying that a set of device-based profiles associated with similar user behavior and correlated IP addresses for different devices are to be merged; and (b) one or more of:

(i) a no-authenticated-profile option that prevents authentication-based profiles from being merged with selected device-based profiles, (ii) a current-authenticated-profile option specifying that current authentication-based profiles should merged with the selected device-based profiles, (iii) a last-authenticated-profile option specifying that trait information associated with a most recently encountered authentication-based profile should be used for merging with the selected device-based profiles;

identifying, by a computing system and from the selection, an authentication-based profile merge option from the authentication-based profile merge options and a device-based profile merge option from the device-based profile merge options;

selecting, by the computing system, a set of at least some profiles from the profiles for the tracked entities, wherein the selected set satisfies (a) first criteria specified via the authentication-based profile merge option and (b) second criteria specified via the device-based profile merge option;

merging, by the computing system, the set of at least some profiles into merged profiles, wherein the merging is constrained by the selection and comprises updating one or more databases with data that associates, via a common identifier, trait data stored in the set of at least some profiles, wherein the merging being constrained comprises one or more of:

(a) a first merging being implemented based on a selection of the no-authenticated-profile option and the current-authenticated-profile option or (ii) the last-authenticated-profile option, wherein the first merging allows for tracking entities based on single-user authenticated data from multiple sources, (b) a second merging being implemented based on a selection of the no-device-profile option and the user-device-graph option, wherein the second merging allows for tracking a user's activity across multiple devices, (c) a third merging being implemented based on a selection of the last-authenticated-profile option and the current-device-profile option, wherein the third merging allows for tracking a most last known authenticated user of a device, (d) a fourth merging being implemented based on a selection of the no-authenticated-profile option and the household-device-graph option, wherein the fourth merging allows for tracking devices associated with a common location and without traits from tracked entities, (e) a fifth merging being implemented based on a selection of the current-authenticated-profile option and the no-device-profile option, the fifth merging allows for tracking entities based on authenticated data and without anonymous device-level data, and (f) a sixth merging being implemented based on a selection of the no-authenticated-profile option and the current-device-profile option, wherein the sixth merging allows for tracking device-level activity without limitation to a specific device user; and generating, by the computing system, a segment of tracked entities from the merged profiles.

2. The method of claim 1, further comprising:

receiving an input on the user interface specifying segment rules for generating the segment, wherein the segment is generated by applying the segment rules; and transmitting, to the segment of tracked entities, a marketing communication uniquely tailored for the segment of tracked entities.

3. The method of claim 1, further comprising causing a display device to present, on the user interface, options for merging the authentication-based profiles and the device-based profiles, wherein presenting the options and merging the at least some of the profiles comprises at least one of:

(a) presenting, in the user interface, an interface element configured for selecting the no-authenticated-profile option, (b) presenting, in the user interface, an interface element configured for selecting the current-authenticated-profile option, or (c) presenting, in the user interface, an interface element configured for selecting the last-authenticated-profile option.

4. The method of claim 1, further comprising causing a display device to present, on the user interface, an interface element for selecting one or more data sources storing the current authentication-based profiles selectable via the current-authenticated-profile option.

5. The method of claim 1, wherein a selection of the current-authenticated-profile option causes, in the merging, retrieval of device profiles for all devices associated with a currently authenticated profile.

6. The method of claim 1, wherein a selection of the household-device-graph option causes, in the merging, retrieval of device profiles for all devices associated with a household.

7. The method of claim 1, further comprising:

causing a display device to present, on the user interface (a) a first interface portion having a set of the authentication-based profile merge options for controlling merges of the authentication-based profiles and (b) a second interface portion having a set of the device-based profile merge options for controlling merges of the device-based profiles;

receiving a selection of the authentication-based profile merge options via the first interface portion and the device-based profile merge options via the second interface portion.

8. A system comprising:

a processing device; and a memory device communicatively coupled to the processing device, wherein the processing device is configured to execute instructions including in the memory device to perform operations comprising:

accessing profiles for a plurality of tracked entities, the profiles comprising (a) authentication-based profiles having trait data keyed to user account identifiers and collected during interactions with one or more online services that have authenticated the user account identifiers and (b) device-based profiles having trait data keyed to identifiers of computing devices that interact with the one or more online services;

receiving, from an input device and via a user interface displaying merge options, a selection of authentication-based profile merge options and device-based profile merge options, the selection comprising:
(a) one or more of:
  (i) a no-device-profile option that prevents device-based profiles from being merged with selected authentication-based profiles,
  (ii) a current-device-profile option specifying that device-level traits and associated tracked activity should be merged with the selected authentication-based profiles,
  (iii) a profile-merge-device-graph option specifying that gathered a set of traits for a set of most recently tracked devices and a set of device data from the set of most recently tracked devices, wherein a number of devices in the set of most recently tracked devices is configurable via the user interface,
  (iv) a household-device-graph option specifying that a household set of device-based profiles having a common IP address or a common geographic location are to be merged, and
  (v) a user-device-graph option specifying that a set of device-based profiles associated with similar user behavior and correlated IP addresses for different devices are to be merged; and
(b) one or more of:
  (i) a no-authenticated-profile option that prevents authentication-based profiles from being merged with selected device-based profiles,
  (ii) a current-authenticated-profile option specifying that current authentication-based profiles should merged with the selected device-based profiles,
  (iii) a last-authenticated-profile option specifying that trait information associated with a most recently encountered authentication-based profile should be used for merging with the selected device-based profiles;

identifying, by a computing system and from the selection, an authentication-based profile merge option from the authentication-based profile merge options and a device-based profile merge option from the device-based profile merge options;

selecting, by the computing system, a set of at least some profiles from the profiles for the tracked entities, wherein the selected set satisfies (a) first criteria specified via the authentication-based profile merge option and (b) second criteria specified via the device-based profile merge option;

merging, by the computing system, the set of at least some profiles into merged profiles, wherein the merging is constrained by the selection and comprises updating one or more databases with data that associates, via a common identifier, trait data stored in the set of at least some profiles, wherein the merging being constrained comprises one or more of:
(a) a first merging being implemented based on a selection of the no-authenticated-profile option and the current-authenticated-profile option or (ii) the last-authenticated-profile option, wherein the first merging allows for tracking entities based on single-user authenticated data from multiple sources,
(b) a second merging being implemented based on a selection of the no-device-profile option and the user-device-graph option, wherein the second merging allows for tracking a user's activity across multiple devices,
(c) a third merging being implemented based on a selection of the last-authenticated-profile option and the current-device-profile option, wherein the third merging allows for tracking a most last known authenticated user of a device,
(d) a fourth merging being implemented based on a selection of the no-authenticated-profile option and the household-device-graph option, wherein the fourth merging allows for tracking devices associated with a common location and without traits from tracked entities,
(e) a fifth merging being implemented based on a selection of the current-authenticated-profile option and the no-device-profile option, the fifth merging allows for tracking entities based on authenticated data and without anonymous device-level data, and
(f) a sixth merging being implemented based on a selection of the no-authenticated-profile option and the current-device-profile option, wherein the sixth merging allows for tracking device-level activity without limitation to a specific device user; and generating, by the computing system, a segment of tracked entities from the merged profiles.

9. The system of claim 8, wherein the processing device is configured to execute instructions including in the memory device to perform operations further comprising:
receiving an input on the user interface specifying segment rules for generating the segment, wherein the segment is generated by applying the segment rules.

10. The system of claim 8, wherein the processing device is configured to execute instructions including in the memory device to perform operations further comprising:
transmitting, to the segment of tracked entities, a marketing communication uniquely tailored for the segment of tracked entities.

11. The system of claim 8, the operations further comprising causing a display device to present, on the user interface, options for merging the authentication-based profiles and the device-based profiles, wherein presenting the options and merging the at least some of the profiles comprises at least one of:
(a) presenting, in the user interface, an interface element configured for selecting the no-authenticated-profile option,
(b) presenting, in the user interface, an interface element configured for selecting the current-authenticated-profile option, or
(c) presenting, in the user interface, an interface element configured for selecting the last-authenticated-profile option.

12. The system of claim 8, the operations further comprising causing a display device to present, on the user interface, an interface element for selecting one or more data sources storing the current authentication-based profiles selectable via the current-authenticated-profile option.

13. The system of claim 8, wherein a selection of the current-authenticated-profile option causes, in the merging, retrieval of device profiles for all devices associated with a currently authenticated profile.

14. The system of claim 8, wherein a selection of the household-device-graph option causes, in the merging, retrieval of device profiles for all devices associated with a household.

15. A non-transitory computer-readable medium with program code stored thereon, wherein the program code is executable to perform operations comprising:

accessing profiles for a plurality of tracked entities, the profiles comprising (a) authentication-based profiles having trait data keyed to user account identifiers and collected during interactions with one or more online services that have authenticated the user account identifiers and (b) device-based profiles having trait data keyed to identifiers of computing devices that interact with the one or more online services;

receiving, from an input device and via a user interface displaying merge options, a selection of authentication-based profile merge options and device-based profile merge options, the selection comprising:

(a) one or more of:
   (i) a no-device-profile option that prevents device-based profiles from being merged with selected authentication-based profiles,
   (ii) a current-device-profile option specifying that device-level traits and associated tracked activity should be merged with the selected authentication-based profiles,
   (iii) a profile-merge-device-graph option specifying that gathered a set of traits for a set of most recently tracked devices and a set of device data from the set of most recently tracked devices, wherein a number of devices in the set of most recently tracked devices is configurable via the user interface,
   (iv) a household-device-graph option specifying that a household set of device-based profiles having a common IP address or a common geographic location are to be merged, and
   (v) a user-device-graph option specifying that a set of device-based profiles associated with similar user behavior and correlated IP addresses for different devices are to be merged; and (b) one or more of:
   (i) a no-authenticated-profile option that prevents authentication-based profiles from being merged with selected device-based profiles,
   (ii) a current-authenticated-profile option specifying that current authentication-based profiles should merged with the selected device-based profiles,
   (iii) a last-authenticated-profile option specifying that trait information associated with a most recently encountered authentication-based profile should be used for merging with the selected device-based profiles;

identifying, from the selection, an authentication-based profile merge option from the authentication-based profile merge options and a device-based profile merge option from the device-based profile merge options;

selecting a set of at least some profiles from the profiles for the tracked entities, wherein the selected set satisfies (a) first criteria specified via the authentication-based profile merge option and (b) second criteria specified via the device-based profile merge option;

merging the set of at least some profiles into merged profiles, wherein the merging is constrained by the selection and comprises updating one or more databases with data that associates, via a common identifier, trait data stored in the set of at least some profiles, wherein the merging being constrained comprises one or more of:

(a) a first merging being implemented based on a selection of the no-authenticated-profile option and the current-authenticated-profile option or (ii) the last-authenticated-profile option, wherein the first merging allows for tracking entities based on single-user authenticated data from multiple sources, (b) a second merging being implemented based on a selection of the no-device-profile option and the user-device-graph option, wherein the second merging allows for tracking a user's activity across multiple devices, (c) a third merging being implemented based on a selection of the last-authenticated-profile option and the current-device-profile option, wherein the third merging allows for tracking a most last known authenticated user of a device, (d) a fourth merging being implemented based on a selection of the no-authenticated-profile option and the household-device-graph option, wherein the fourth merging allows for tracking devices associated with a common location and without traits from tracked entities, (e) a fifth merging being implemented based on a selection of the current-authenticated-profile option and the no-device-profile option, the fifth merging allows for tracking entities based on authenticated data and without anonymous device-level data, and (f) a sixth merging being implemented based on a selection of the no-authenticated-profile option and the current-device-profile option, wherein the sixth merging allows for tracking device-level activity without limitation to a specific device user; and generating a segment of tracked entities from the merged profiles.

16. The non-transitory computer-readable medium of claim 15, wherein the program code is executable to perform operations further comprising:

receiving an input on the user interface specifying segment rules for generating the segment, wherein the segment is generated by applying the segment rules.

17. The non-transitory computer-readable medium of claim 15, wherein the program code is executable to perform operations further comprising:

transmitting, to the segment of tracked entities, a marketing communication uniquely tailored for the segment of tracked entities.

18. The non-transitory computer-readable medium of claim 15, the operations further comprising causing a display device to present, on the user interface, options for merging the authentication-based profiles and the device-based profiles, wherein presenting the options and merging the at least some of the profiles comprises at least one of:

(a) presenting, in the user interface, an interface element configured for selecting the no-authenticated-profile option, (b) presenting, in the user interface, an interface element configured for selecting the current-authenticated-profile option, or
(c) presenting, in the user interface, an interface element configured for selecting the last-authenticated-profile option.

19. The non-transitory computer-readable medium of claim 15, the operations further comprising causing a display device to present, on the user interface, an interface element for selecting one or more data sources storing the current authentication-based profiles selectable via the current-authenticated-profile option.

20. The non-transitory computer-readable medium of claim 15, wherein a selection of the current-authenticated-profile option causes, in the merging, retrieval of device profiles for all devices associated with a currently authenticated profile.

\* \* \* \* \*